United States Patent
Albrecht et al.

(10) Patent No.: US 9,114,831 B2
(45) Date of Patent: Aug. 25, 2015

(54) ACTUATOR CONTROL SYSTEM

(75) Inventors: Preben Albrecht, Soenderborg (DK); John Kristensen, Soenderborg (DK); Steve Crow, Ames, IA (US); Kjeld Buus Jensen, Soenderborg (DK)

(73) Assignee: Danfoss Power Solutions ApS, Nordborg (DK)

( * ) Notice: Subject to any disclaimer, the term of this patent is extended or adjusted under 35 U.S.C. 154(b) by 906 days.

(21) Appl. No.: 11/956,486

(22) Filed: Dec. 14, 2007

(65) Prior Publication Data

US 2008/0236932 A1    Oct. 2, 2008

(30) Foreign Application Priority Data

Dec. 18, 2006   (DK) .................................. 2006 01654

(51) Int. Cl.
  *B62D 5/09* (2006.01)
  *B62D 5/30* (2006.01)
  *B62D 5/00* (2006.01)
  *B63H 25/12* (2006.01)
  *F15B 20/00* (2006.01)

(52) U.S. Cl.
  CPC *B62D 5/30* (2013.01); *B62D 5/003* (2013.01); *B62D 5/09* (2013.01); *B63H 25/12* (2013.01); *F15B 20/004* (2013.01); *F15B 2211/20576* (2013.01); *F15B 2211/265* (2013.01); *F15B 2211/6336* (2013.01); *F15B 2211/6346* (2013.01); *F15B 2211/8633* (2013.01); *F15B 2211/8636* (2013.01); *F15B 2211/8757* (2013.01)

(58) Field of Classification Search
  CPC ........ B62D 5/003; B62D 5/0457; B62D 5/07; B62D 5/087; B62D 5/09; F15B 20/004; F15B 2211/20576; F15B 2211/265; F15B 2211/6336; F15B 2211/6346; F15B 2211/8633; F15B 2211/8636; F15B 2211/8757
  USPC ......................................... 180/442; 91/471, 9
  See application file for complete search history.

(56) References Cited

U.S. PATENT DOCUMENTS

| | | | |
|---|---|---|---|
| 3,963,372 A | | 6/1976 | McLain et al. |
| 3,987,702 A | * | 10/1976 | Boss et al. .......................... 91/1 |
| 5,456,523 A | * | 10/1995 | Boehringer ..................... 303/13 |

(Continued)

FOREIGN PATENT DOCUMENTS

| | | |
|---|---|---|
| DE | 10052343 | 7/2002 |
| DE | 10159297 | 6/2003 |

(Continued)

*Primary Examiner* — Joseph Rocca
*Assistant Examiner* — Jacob Knutson
(74) *Attorney, Agent, or Firm* — McCormick, Paulding & Huber LLP

(57) ABSTRACT

The invention provides a method and a system for moving an element, e.g. a rudder of a ship or a wheel of a vehicle. The element is moved by a hydraulic fluid. According to the invention, an operator indicates a desired movement, and in accordance with the desired movement, at fluid is provided from at least three fluid providers each providing a share of the fluid in parallel streams and only considering the desired movement not the shares provided by the other fluid providers. The invention allows continuation of a steering task even if one fluid provider is disabled, and the invention allows the continuation even without having to notice that one provider is disabled. Accordingly, the invention provides an improvement and simplification relative to the known hydraulic steering systems.

22 Claims, 4 Drawing Sheets

(56) References Cited

U.S. PATENT DOCUMENTS

| | | | |
|---|---|---|---|
| 5,747,950 A | 5/1998 | Friedrichsen et al. | |
| 5,791,596 A * | 8/1998 | Gautier et al. | 244/76 R |
| 6,067,782 A | 5/2000 | Diekhans | |
| 6,208,923 B1 | 3/2001 | Hommel | |
| 6,651,930 B1 * | 11/2003 | Gautier et al. | 244/78.1 |
| 6,668,967 B2 | 12/2003 | Sorensen et al. | |
| 2005/0236220 A1 * | 10/2005 | Soeda et al. | 180/442 |

FOREIGN PATENT DOCUMENTS

| | | |
|---|---|---|
| DE | 10302268 | 7/2004 |
| EP | 0856453 A2 | 12/1997 |
| EP | 1016589 A1 | 5/2000 |

* cited by examiner

ACTUATOR CONTROL SYSTEM

CROSS REFERENCE TO RELATED APPLICATION

Applicant hereby claims foreign priority benefits under U.S.C. §119 from Danish Patent Application No. PA 2006 01654 filed on Dec. 18, 2006, the contents of which are incorporated by reference herein.

TECHNICAL FIELD

The present invention relates to a method and a control system for controlling movement of an element based on a flow of a primary fluid.

BACKGROUND OF THE INVENTION

The control system according to the present invention may be used in general for controlling operation of a machine. In the following, the invention will, however, be exemplified by reference to a steering system.

Ships and vehicles, and in particular off-highway machinery such as wheel loaders, excavators, dozers, articulated vehicles, tractors, harvesters and similar heavy duty machines often operate with hydraulic, electro-hydraulic, and electric steering systems. Typically, the steering system receives a desired input to indicate a desired angular movement of the ship or vehicle. The input could be provided via input means such as a joystick or a steering wheel, or the input could be derived from a GPS system or similar system for positioning and tracking. The input is converted into a signal for an actuator, e.g. a hydraulic cylinder, which moves a steered element, e.g. a wheel of a vehicle or a rudder of a ship. Steering systems are disclosed e.g. in U.S. Pat. No. 6,668,967 and in EP0856453.

In a fully hydraulic steering, the actuator is typically supplied with a hydraulic flow via a steering unit which is connected to the steering input means. The steering unit often comprises a spool which is moved based on the position of the input means. The spool opens or closes a path from a source of a hydraulic fluid under pressure to one out of two hydraulic ports of the actuator. A fluid flow into one of the ports and out or the other port forces the actuator to move in one direction and a fluid flow in an opposite direction forces the actuator to move oppositely, e.g. right or left. Typically, the input means is a steering wheel or a joystick. The input means is movable between a centre set-point and set-points on opposite sides of the centre set-point, e.g. corresponding to a right turn or a left turn.

In steering systems and other control systems, reliability is important. An incorrect electrical signal or fluid flow may cause wrong steering and thus be dangerous. In order to increase reliability, several control systems are sometimes connected in parallel. If one system faults, another one will take over. This, however, requires fault detection and switching between parallel systems.

SUMMARY OF THE INVENTION

It is an object of the invention to provide a method of controlling movement of an element and to provide a control system in accordance therewith. In particular, it is an object to provide an improved steering system for a ship or a vehicle. It is an object of embodiments of the invention to enable an improved simplicity and reliability compared with known control systems.

According to a first aspect, the invention provides a method for moving an element based on movement of at least a primary actuator which is adapted to receive a flow of a primary fluid. The method comprises:
  providing a desired movement of the element,
  providing at least three shares of the flow of the primary fluid, each share having a flow rate and a pressure defining power by which the share can move an object,
  operating the actuator by use of the power, and
  moving the element as a consequence of the operation of the actuator
characterized in that each share is provided without considering the power provided by the other shares until the desired movement is obtained.

Since each of the at least three shares of the flow of the primary fluid is provided merely considering the desired movement and not the power provided by the other shares, the movement of the element would continue even if one or two of the shares are interrupted, e.g. due to a malfunction in a valve or pump.

In particular, each share of the fluid may be provided by independently operating fluid providers. As an example, each such provider may comprise a fluid supply, e.g. a pump, a valve, or a combination thereof, and a controller which is capable of controlling the supply. The controller may receive a signal indicating the desired movement e.g. from a steering wheel, a joystick etc, and to facilitate that each share is provided until the desired movement is obtained, a sensor may be arranged in working relationship with the element, and a signal which is significant for the movement may be returned to each of the abovementioned controllers.

In the following, the wording "providing movement of an element" may cover either providing a certain speed of the element, or obtaining a certain positioning of the element. In a corresponding manner, the wording "determining movement of an element" may cover determining by which speed the element moves, determining by which acceleration the element moves, or determining an achieved repositioning of the element.

It may be an advantage to provide the shares so that two of the shares will always provide larger power than the third share. It is therefore an advantage to provide the flows so that the difference between the most powerful share and the least powerful share is less than the sum of power of other shares of the system. If one of the shares counteracts the movement, the correct movement of the element may continue since the remaining shares always provide more power than the one which counteracts the movement. Alternatively, each share may be essentially identical or at least provide essentially equal power.

By providing the power from all shares simultaneously, it is achieved that operation of the system may continue uninterruptedly if one of the shares is interrupted. This provides a very robust and safe system in which the operator may not even notice that a fault occurs. As will be explained in further details later, an alarm may though indicate a fault irrespective that the system continuous uninterruptedly.

The element may be connected mechanically to the actuator to move upon operation of the actuator, or the actuator may control a flow of a secondary fluid which again works on a secondary actuator which moves the element.

The fluid may in particular be a hydraulic fluid

In a second aspect, the invention provides a system for controlling movement of an element based on movement of a primary actuator which is adapted to receive a flow of a primary fluid. The system comprises:

an input device adapted to provide an operator input signal significant for a desired movement of the element, a primary actuator operable by the provided fluid and arranged in working relationship with the element to effect movement thereof, a sensor for providing a sensor signal significant for the movement, and at least three fluid providers each comprising an independently operating control system adapted to receive the operator input signal and the sensor signal, and based on the received signals to provide a share of the primary fluid. The fluid providers may e.g. provide the shares simultaneously, until the desired movement is obtained.

The working relationship may either imply that the actuator is directly mechanically connected to the element, or it may imply that the actuator controls a flow of a secondary fluid, e.g. a fluid at a higher pressure. The secondary fluid may then operate on a secondary actuator which is mechanically connected to the element. In fact, any number of additional sets of fluid controllers and fluid actuators may be inserted between the primary actuator and the element without parting from the invention. The element could be constituted by an element of a mechanism like a crane, vehicle or vessel or any other machine, e.g. a wheel of a vehicle or a rudder of a ship.

The primary actuator may e.g. control the flow of the secondary fluid by moving a spool in a valve of the kind known in the art. In this case, the wording "primary actuator" covers what makes the spool move, i.e. typically a fluid which acts on a piston on opposite sides of the spool.

The spool may have a position sensor for determining an actual movement of the spool, and the position could be used for a closed loop control of the three fluid providers. Alternatively, or additionally, at least one element position sensor for determining an actual movement of the element may be provided, again for making closed loop control of the at least three fluid providers so that they provide the share of the fluid based on the actual movement of the spool or the element.

The flow providers may preferably be adapted to provide the shares of the fluid simultaneously and in parallel streams.

The input could be a mechanically movable handle such as a joystick, a steering wheel, a set of push buttons or any similar means which is suitable for a specific control purpose, e.g. for steering a vehicle. Alternatively, input could be provided from a Global Positioning System (GPS), or from similar systems for automatic steering.

The input device may be adapted to generate an electrical command signal based on the operator input and the fluid providers may comprise a controller adapted, based on the command signal, to provide an electrical control signal for at least three electrically operated valves.

Since the system according to the invention may continue uninterruptedly even if one of the fluid providers fails, the system may comprise an alarm structure to alert an operator, e.g. by a visible or audible signal if a fault occurs, e.g. if one of the fluid providers does not provide the share which it is supposed to provide, or if a desired movement of the element or parts of the hydraulic system in general cannot be obtained.

The alarm structure may comprise a storage for a first test value indicating an expected movement of the spool or element for a certain flow of the primary fluid, and it may be adapted to trigger an alarm when sensing an actual movement of the spool or element which is different from the expected movement for this flow.

In case the actuator operates on a spool, the alarm structure may comprise storage for a second test value indicating an expected movement of the spool or element for a certain flow of the secondary fluid, and it may be adapted to trigger upon sensing an actual movement of the secondary element which is different from the expected movement for this flow.

DESCRIPTION OF PREFERRED EMBODIMENTS

Figure 1:
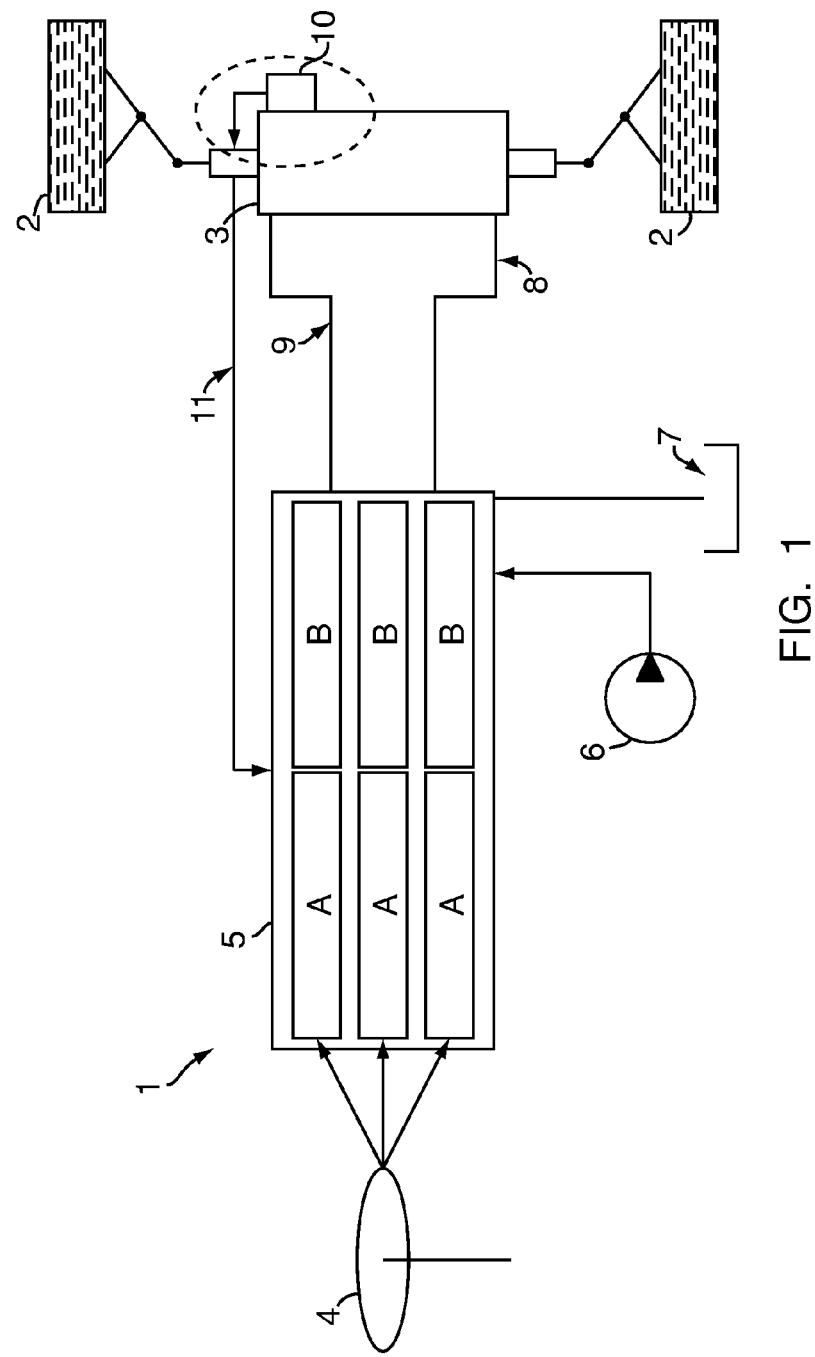
FIG. 1 illustrates diagrammatically a system 1 for controlling movement of an element.

In the following, embodiments of the invention will be described in further details with reference to the drawing.

FIG. 1 illustrates a system 1 for controlling movement of an element 2. In this case, the element is constituted by wheels of a vehicle. The movement is controlled based on movement of a primary actuator 3 which is adapted to receive a flow of a primary fluid. The system comprises an input device 4, illustrated schematically as a steering wheel. By use of the steering wheel, an operator may indicate a desired movement of the element, e.g. a desired turning of a vehicle. The control system 5 receives the input from the steering wheel and comprises at least three fluid providers each adapted, based on the input, to provide a share of the primary fluid. For simplicity, the control system 5 is drawn as a box containing three sets of two boxes. The control system is shown in further details in the following figures. The control system comprises a controller part, A, and a hydraulic part, B, at least one of which comprises the above mentioned three parallel segments. The controller part determines based on input from the operator and feedback from a position sensor, the amount of fluid which is to be provided, and controls the fluid part B in accordance therewith. The primary fluid is provided by a high pressure pump 6, e.g. at several hundred bar pressure, and the fluid is returned to the tank 7. In response to a left-side rotation of the steering wheel, the primary fluid is pumped in the left-side conduit 8 towards one side of the primary actuator 3. The primary actuator is in direct mechanical contact with the wheels and therefore, in response to the received fluid, turns the wheels of the vehicle. Simultaneously, fluid is returned to the tank via the right-side conduit 9. On rotation of the steering wheel in opposite direction, fluid is pumped towards the steering cylinder in the right-side conduit 9 and it is returned to tank via the left-side conduit 8.

As will be described in further details with reference to the following figures, the system may either operate with the primary fluid directly working on the actuator which moves the element, or the primary fluid may be used for moving a spool which controls flow of a secondary fluid which again moves an actuator which works on the element. In case of the latter, the secondary fluid could be at a much higher pressure and/or at a much higher flow rate than the primary fluid, and it may thus function as an amplifier of the power which is generated by the system.

The system comprises a position sensor 10 which determines the movement of the wheels and returns a signal via the wire 11 to the controller part A of the control system. In that way, each of the fluid providers may provide the share without considering the power which is provided by the other shares, and each provider may continue to provide its share until the desired movement is obtained.

Figure 2:
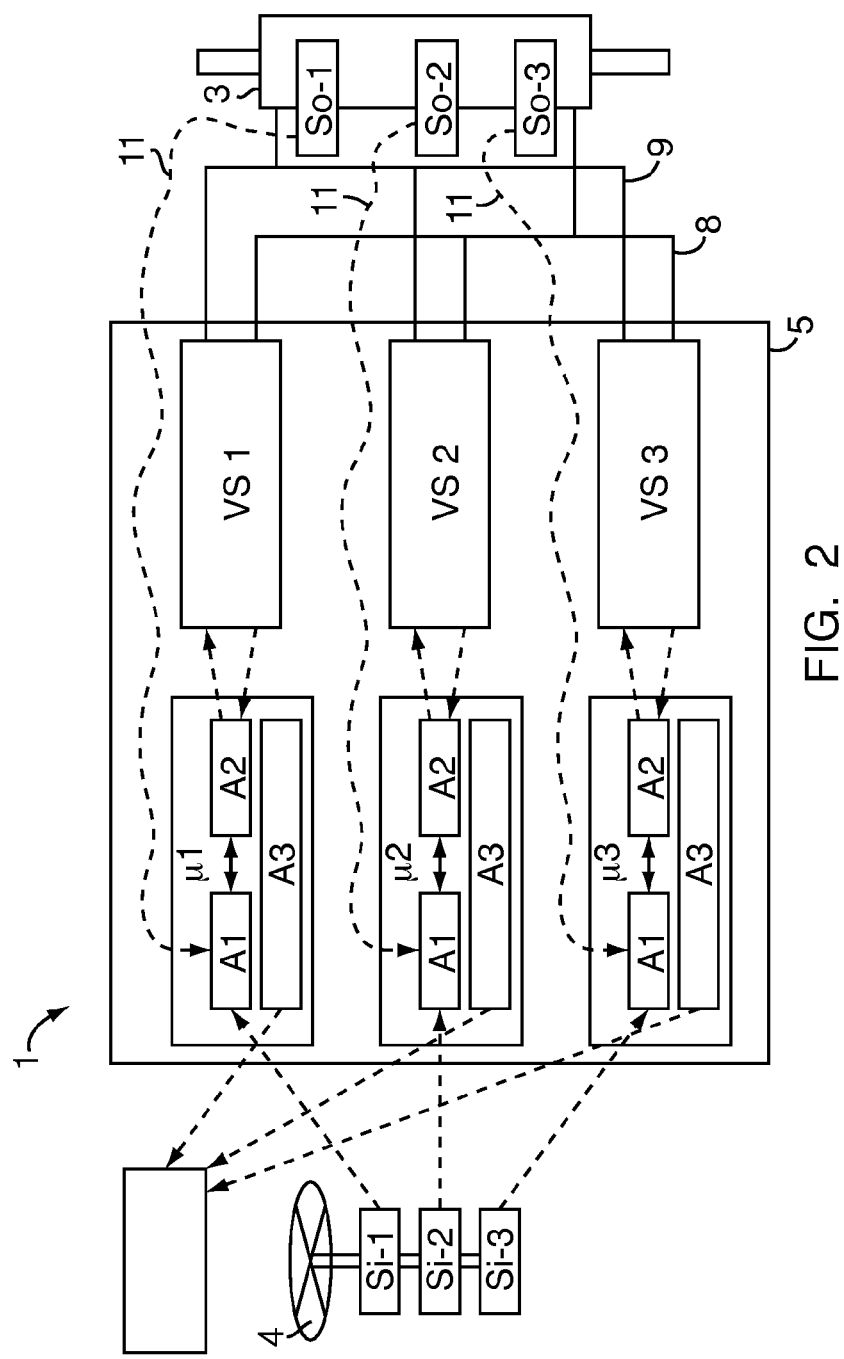
FIG. 2 illustrates the system in FIG. 1 in further details.

FIG. 2 illustrates the system in FIG. 1 in further details. The input device 4 comprises three sensors, Si-1, Si-2, and Si-3, the sensors determine rotation of the steering wheel and converts it to an electrical signal. The electrical signals are transmitted to three independent fluid providers µ1/VS1, µ2/VS2, µ3/VS3. Each provider comprises a controller µ1, µ2, µ3. Each controller operates on a closed loop cylinder position algorithm A1, a closed loop main spool position algorithm, A2, and an alarm signal algorithm A3. By electrical signals, each controller controls one of the electrically operated valve segments VS1, VS2, and VS3 which provide fluid under pressure to the actuator and receive fluid in return from the actuator. The actuator is provided with three independently operating position sensors which determine movement of the actuator. Each sensor is associated with one of the controllers and returns an electrical signal representing the movement to that controller. The system further comprises an alarm structure, A, which may receive an error signal from the alarm algorithm A3. The alarm algorithm may provide an alert signal if a desired movement of the element cannot be obtained. As an example, the alarm algorithm may contain a first setting of a test value which indicates an expected movement considering a certain flow of fluid which is provided to effect movement of the element or to effect movement of other parts of the hydraulic system, e.g. a spool. The alarm structure may then be adapted to trigger an alarm, e.g. an audible or visual alarm, upon sensing an actual movement which is different from the expected movement for this flow.

Figure 3:
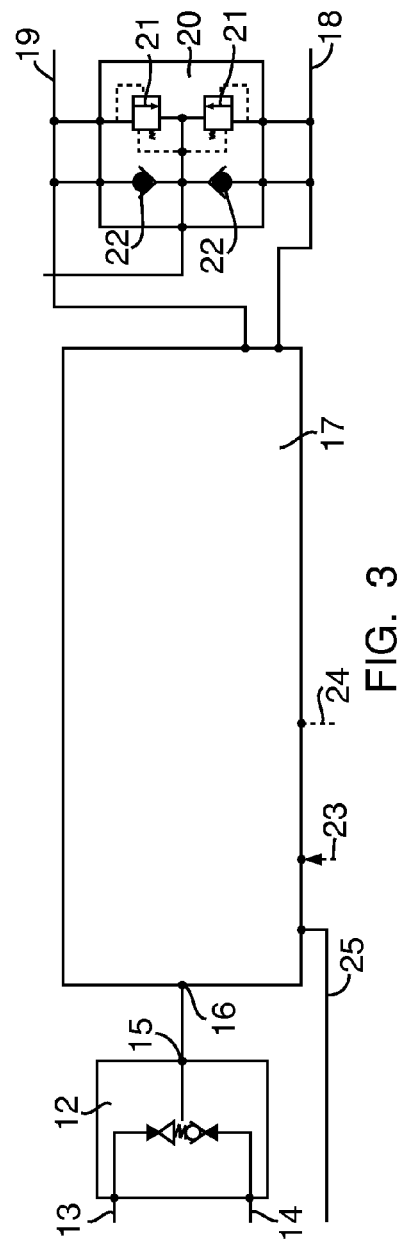
FIG. 3 illustrates in further details, a diagram of the hydraulic part.

FIG. 3 illustrates in further details, a diagram of the hydraulic part, c.f. indication B in FIG. 1. The hydraulic part comprises a flow source selector 12 with a first inlet 13 and a second inlet 14 for high pressure fluid from a pump. Via the outlet 15 of the flow source selector 12, the fluid is forwarded to the inlet 16 of a main fluid portion 17. The main fluid portion is shown in further details in FIG. 4. From the main fluid portion 17, the fluid is forwarded in a first outlet 18 to a right side of an actuator, e.g. a steering cylinder which moves the element (neither the actuator, nor the element is disclosed in FIG. 3), and in a second outlet 19, to a left side of the actuator. The unit 20 contains system protection overpressure valves 21 and anti-cavitation check valves 22. The main fluid portion 17 has an electrical connector 23 for an electrical control signal from the controller part, c.f. indication A in FIG. 1, and an electrical connector 24 for an electrical sensor signal to the controller part A. The control signal indicates a desired movement of a spool in the main fluid portion, and the sensor signal indicates actual movement of the spool. The connector 25 provides a load sensing signal to a load sensing pump, a priority valve or to any similar source of pressurized fluid.

Figure 4:
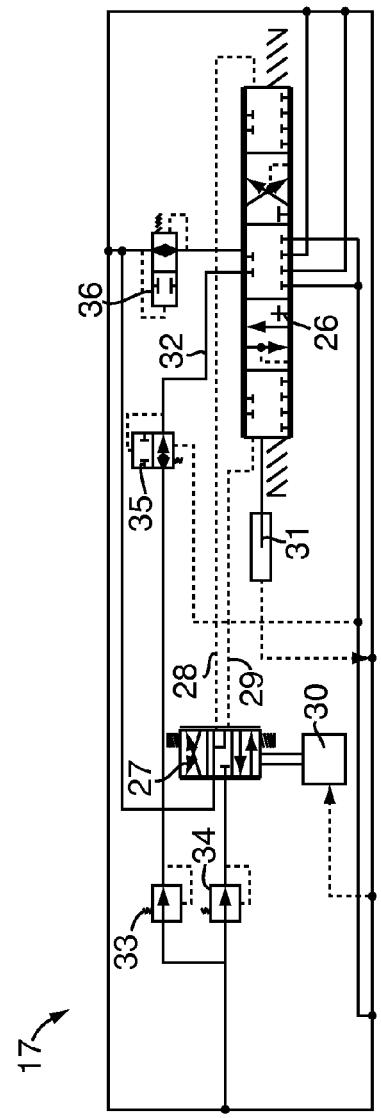
FIG. 4 illustrates further details of the main fluid portion.

FIG. 4 illustrates further details of the main fluid portion 17 which comprises a main spool 26 with hydraulic load sensing features. The main spool 26 is moved in a housing by a pressure of a primary fluid. The primary fluid is provided by the pilot valve 27 via the fluid conduits 28, 29. The pilot valve 27 is moved by a relatively small electrically operated actuator 30 based on signals from the controller, c.f. indication A in FIG. 1. The movement of the main spool 26 is determined by the sensor 31. The main spool controls flow of a secondary fluid provided via the conduit 32. The main fluid portion 17 comprises a number of peripheral components which serve various purposes, e.g. to provide a constant pressure over the main spool. Illustrated in FIG. 4 are a pressure limiter 33, a pilot pressure regulation 34, a pressure compensation meter-IN 35, and a pressure compensation meter-OUT 36 or a velocity fuse. In accordance with the invention, the embodiment illustrated in FIG. 4 comprises three main fluid portions 17 and thereby at least three main spools 26 and at least three pilot valves 27. The embodiment of FIGS. 3-4 allows the element to be constituted e.g. by the wheels of a vehicle, a rudder of a ship, a boom of a crane etc. The main spool 41 controls flow of a secondary fluid, and it is moved by a primary fluid which is provided by at least three independent fluid providers, namely the pilot valve 27 e.g. in form of a spool etc. When the entire main fluid portion 17 is provided in three independent parallel units, the pilot valve 27 is correspondingly provided as three independent units.

Figure 5:
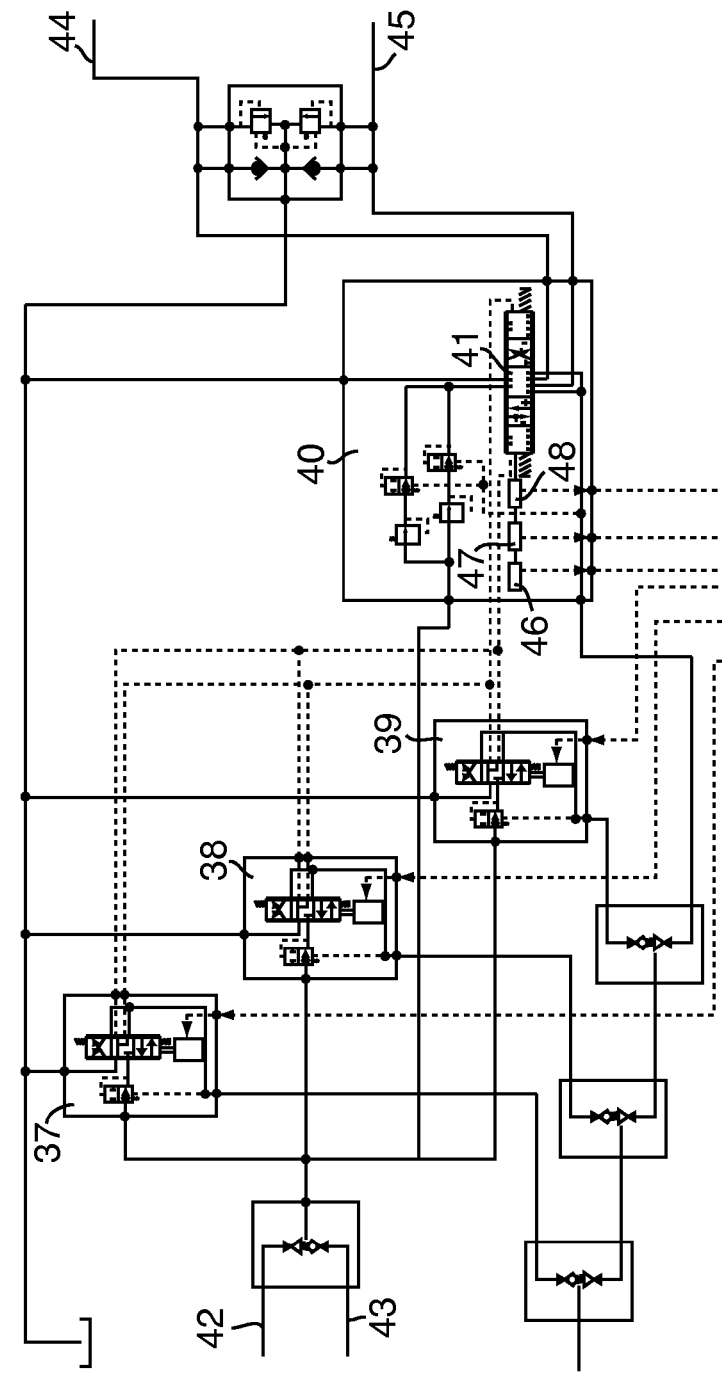
FIG. 5 illustrates an alternative design of the hydraulic part.

FIG. 5 illustrates an alternative design of the hydraulic part, c.f. indication B in FIG. 1. In this embodiment of the invention, at least three pilot valve assemblies 37, 38, 39 but only one single main spool assembly 40 with one single main spool 41 is required. Except from this main difference, the embodiment of FIG. 5 has essentially similar functionality as the embodiment in FIGS. 3 and 4. The hydraulic part comprises inlets 42, 43 for receiving the high pressure fluid from the pump, and outlets 44, 45 for moving the actuator (not shown). The main spool position is determined by three independent sensors 46, 47, 48.

Other details of the schematic may also change to improve fail safe operation of the system. These changes may include:
Redundant working pressure regulation and pressure compensation features,
Pressure compensation across all pilot valves
Load sense functionality added to all pilot valves, and
Design robustness to allow pilot pressure delta to operate at a maximum system pressure delta (wherein pressure delta is the pressure drop over the system).

Relative to the invention and the claim wording, the embodiment of FIG. 5 allows the element to be constituted by the main spool 41 which is moved by the primary fluid pressure provided via the three fluid providers, namely the pilot valves 37, 38, 39.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A method for moving an element based on movement of at least a primary actuator which is adapted to receive a flow of a primary fluid, the method comprising:
providing a desired movement of the element,
simultaneously providing at least three shares of the flow of the primary fluid by at least three independently operating fluid providers, each fluid provider comprising a separate controller and a fluid supply, the controller controlling operation of the fluid supply, each share having a flow rate and a pressure defining power by which the share can move an object,
operating the actuator by use of the power from the at least three independently operating fluid providers,
sensing an actual movement of the element, and
moving the element as a consequence of the operation of the actuator,
wherein each controller controls the associated fluid supply to provide the share of the primary fluid to the at least one primary actuator based on the desired movement of the element and the actual movement of the element without considering the power provided by the other fluid providers until the desired movement is obtained.

2. The method according to claim 1, wherein a first one of the shares provides more power than the other shares, a second one of the shares provides less power than the other shares, and a third one of the shares provides less power than the first share and more power than the second share, a difference between power of the first and second shares being less than power of the third share.

3. The method according to claim 1, wherein each share provides essentially equal power.

4. The method according to claim 1, wherein all shares are provided simultaneously.

5. The method according to claim 1, wherein the element is connected mechanically to the actuator to move upon operation of the actuator.

6. The method according to claim 1, wherein the actuator controls a flow of a secondary fluid, the secondary fluid working on a secondary actuator which moves the element.

7. A system for controlling movement of an element based on movement of a primary actuator which is adapted to receive a flow of a primary fluid, the system comprising:
   an input device adapted to provide an operator input signal significant for a desired movement of the element,
   the primary actuator operable by the provided fluid and arranged in working relationship with the element to effect movement thereof,
   a sensor for providing a sensor signal significant for the actual movement, and
   at least three independently operating fluid providers each comprising a separate controller and a fluid supply, the controller controlling operation of the fluid supply,
   wherein each controller is adapted to receive the operator input signal signifying the desired movement of the element and the sensor signal signifying the actual movement, and based on the received signals to simultaneously control the associated fluid supply to provide a share of the primary fluid without consideration of the other fluid providers until the actual movement achieves the desired movement.

8. The system according to claim 7, wherein the working relationship comprises a mechanical connection between the primary actuator and the element.

9. The system according to claim 7, wherein the primary actuator is arranged to control a flow of a secondary fluid operating on a secondary actuator which is mechanically connected to the element.

10. The system according to claim 9, wherein the primary actuator controls the flow of the secondary fluid by moving a spool in a valve.

11. The system according to claim 10, comprising a spool position sensor for determining an actual movement of the spool.

12. The system according to claim 11, wherein the fluid providers provide the share of the fluid based on the actual movement of the spool or element.

13. The system according to claim 10, comprising a first setting of a test value indicating an expected movement of the spool or element for a certain flow of the primary fluid, and an alarm structure adapted to trigger upon sensing an actual movement of the spool or element which is different from the expected movement for this flow.

14. The system according to claim 10, comprising a second setting of a test value indicating an expected movement of the spool or element for a certain flow of the secondary fluid, and an alarm structure adapted to trigger upon sensing an actual movement of the secondary element which is different from the expected movement for this flow.

15. The system according to claim 7, wherein the input device is adapted to generate an electrical command signal based on the operator input.

16. The system according to claim 15, wherein the separate controllers of the at least three independently operating fluid providers are adapted, based on the command signal, to provide an electrical control signal for at least three electrically operated valves.

17. The system according to claim 7, wherein the element is constituted by a positioning element of a mechanism.

18. The system according to claim 7, wherein the input device comprises a handle suitable for a steering system of a vehicle.

19. The system according to claim 18, comprising for each fluid provider, one sensor capable of converting a movement of the handle into an electrical signal.

20. The system according to claim 7, comprising an alarm structure adapted to provide an alert signal if one of the fluid providers provides an unexpected share.

21. The system according to claim 7, wherein each flow provider comprises an electrically operated valve.

22. The system according to claim 21, wherein the valves are essentially identical.

* * * * *